US008170272B1

(12) United States Patent
Joslin et al.

(10) Patent No.: US 8,170,272 B1
(45) Date of Patent: May 1, 2012

(54) METHOD FOR CLASSIFYING VESSELS USING FEATURES EXTRACTED FROM OVERHEAD IMAGERY

(75) Inventors: Erin Joslin, San Diego, CA (US); Heidi Buck, San Diego, CA (US); Jason Cole, San Diego, CA (US); Daniel Garcia, San Diego, CA (US); Stephen Hobbs, San Diego, CA (US); John Stastny, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 332 days.

(21) Appl. No.: 12/711,110

(22) Filed: Feb. 23, 2010

(51) Int. Cl.
*G06K 9/00* (2006.01)
*G06K 9/62* (2006.01)

(52) U.S. Cl. .......... 382/100; 382/190; 382/224; 348/61

(58) Field of Classification Search ........... 382/100–322
See application file for complete search history.

(56) References Cited

U.S. PATENT DOCUMENTS

| | | | | |
|---|---|---|---|---|
| 4,519,041 | A * | 5/1985 | Fant et al. ..................... | 382/141 |
| 5,122,990 | A * | 6/1992 | Deines et al. ................. | 367/100 |
| 5,142,658 | A * | 8/1992 | McMorran et al. ........... | 382/104 |
| 5,231,401 | A * | 7/1993 | Kaman et al. ................. | 342/55 |
| 5,241,314 | A * | 8/1993 | Keeler et al. ................. | 342/54 |
| 5,248,978 | A * | 9/1993 | Manthy et al. ................ | 342/54 |
| 5,442,358 | A * | 8/1995 | Keeler et al. ................. | 342/54 |
| 7,203,599 | B1 * | 4/2007 | Strack et al. .................. | 702/2 |
| 7,221,621 | B2 * | 5/2007 | Patterson et al. .............. | 367/88 |
| 7,298,866 | B2 * | 11/2007 | Lee ............................... | 382/103 |
| 7,541,969 | B2 * | 6/2009 | Åkerstrom et al. ............ | 342/124 |
| 7,738,707 | B2 * | 6/2010 | Wiedemann et al. .......... | 382/190 |
| 7,760,941 | B2 * | 7/2010 | Bornemann et al. ........... | 382/173 |
| 7,796,809 | B1 * | 9/2010 | Carder et al. .................. | 382/154 |
| 7,916,935 | B2 * | 3/2011 | Larsen et al. .................. | 382/154 |
| 8,116,522 | B1 * | 2/2012 | Buck et al. ..................... | 382/103 |
| 2002/0090121 | A1 * | 7/2002 | Schneider et al. ............. | 382/128 |
| 2003/0185420 | A1 * | 10/2003 | Sefcik et al. ................... | 382/103 |
| 2005/0069207 | A1 * | 3/2005 | Zakrzewski et al. .......... | 382/190 |
| 2007/0035624 | A1 * | 2/2007 | Lubard et al. .................. | 348/144 |

(Continued)

OTHER PUBLICATIONS

Unpublished U.S. Appl. No. 12/197,421, by Heidi Buck et al., entitled "Ship Detection System and Method from Overhead Images", filed Aug. 25, 2008.

*Primary Examiner* — Manav Seth
(74) *Attorney, Agent, or Firm* — Arthur K. Samora; Kyle Eppele

(57) ABSTRACT

Methods for processing overhead imagery of a vessel include the step of determining an initial classification and classification probability based on the vessel length and length-to-width ratio. Next, mutually exclusive deck features can be extracted from the image. For several embodiments, the extracted deck features that can be spherical tanks, hatches and containers that are stored on deck. The initial classification probability is then weighted using the results of the deck feature extraction step to yield a posterior classification probability for the ship image. If the posterior classification probability is above a predetermined value, the image is assigned a posterior classification. If the posterior probability is below the predetermined value, the vessel image is classified as unknown, and the gross tonnage of the vessel is calculated using the length and width of the vessel.

14 Claims, 7 Drawing Sheets

U.S. PATENT DOCUMENTS

| | | | |
|---|---|---|---|
| 2008/0040083 A1* | 2/2008 | Odry et al. | 703/2 |
| 2008/0292146 A1* | 11/2008 | Breed et al. | 382/118 |
| 2009/0204880 A1* | 8/2009 | Ko | 715/202 |
| 2010/0002222 A1* | 1/2010 | Lubard et al. | 356/4.01 |
| 2010/0110198 A1* | 5/2010 | Larson et al. | 348/164 |
| 2010/0296709 A1* | 11/2010 | Ostrovsky-Berman et al. | 382/128 |

* cited by examiner

METHOD FOR CLASSIFYING VESSELS USING FEATURES EXTRACTED FROM OVERHEAD IMAGERY

FEDERALLY-SPONSORED RESEARCH AND DEVELOPMENT

This invention (Navy Case No. 099852) is assigned to the United States Government and is available for licensing for commercial purposes. Licensing and technical inquires may be directed to the Office of Research and Technical Applications, Space and Naval Warfare Systems Center, San Diego, Code 72120, San Diego, Calif. 92152; voice (619) 553-2778; email T2@spawar.navy.mil.

FIELD OF THE INVENTION

The present invention applies generally to the classification of vessels that have been detected by satellites. More specifically, some embodiments of the invention pertain to the processing of satellite vessel imagery to automatically classify detected vessels using characteristic information such as length, width and deck structures, according to a predetermined algorithm.

BACKGROUND OF THE INVENTION

Classification of satellite imagery of vessels is currently a manual process that requires a human analyst trained to recognize primary physical features unique to each ship type. Traditional classification methods identify vessels based on appearance group, hull type, and upright sequence. An analyst examines characteristic features such as the size, shape, and location of superstructure, the shape of the hull, the number and location of islands, and the location of upright devices and machinery as these characteristics appear in the vessel profile. The observed sequence of features is compared to a set of known vessel silhouettes to identify the vessel class.

The comparison method of classification described above requires analysts to memorize an entire library of vessel silhouettes in order for classification to be completed effectively and accurately. With this method, classification can only be completed manually, and only by highly skilled analysts. In addition, the process of classification is not automated; in certain situations, it may be desirable to classify vessels very quickly, for example in a harbor or congested port where many vessels are present. In a congested port or chokepoint, an analyst may be unable to accurately identify vessels of interest as quickly as the mission requires.

Furthermore, features and ship silhouettes used for traditional vessel classification present a side-profile view, which does not easily translate to features that are visible in a top plan view, such as those features extracted from overhead commercial imagery. Stated differently, characteristic appearance information such as hull shape and upright sequence, which is typically used to classify vessels, is not easily extracted from overhead commercial imagery. As a result, an analyst presented with satellite imagery of vessels will most likely not be able to employ traditional methods to accurately classify each ship. What is desired is a new method for classifying vessels using features extracted from overhead imagery, which will allow analysts to quickly and effectively classify vessels in situations where traditional methods are inapplicable.

In view of the above, one object of the present invention is to provide an automated image classification system and method that effectively classifies vessels using an input from satellite overhead imagery. Another object of the present invention is to provide an automated image classification system and method that can classify vessels with greater speed and throughput than prior art manual systems. Yet another object of the present invention is to provide an automated image classification system and method that can function to classify vessels without requiring a dedicated analyst. Still another object of the present invention is to provide an automated image classification system and method that uses a top plan view of the vessel deck instead of a side elevational view of a vessel hull and superstructure profile to classify a vessel. These and other advantages of the invention, as well as additional inventive features, will be apparent from the description of the invention provided herein.

SUMMARY OF THE INVENTION

Methods for processing an overhead image of a vessel according to several embodiments of the present invention can include the step of determining an initial classification and an initial classification probability for the vessel based on the vessel length and length-to-width ratio. The initial classification probability can be determined by comparing the vessel length and length-to-width ratio to length and ratios of other known vessels using publicly available registries of vessel data, or other databases. The initial classifications can include general cargo, tanker, passenger ship, bulk carrier, fishing vessel, service ship, research ship and miscellaneous categories.

The systems and methods of the present invention can further include the step, or a processor that accomplishes the step, of extracting deck features from the satellite image of the vessel. The present invention takes advantage of the fact that certain deck feature of vessels tend to be mutually exclusive. For several embodiments, the deck features that are extracted are spherical tanks, hatches and containers that are stored on deck. The initial classification probability is then weighted using the results of the feature extraction step, to yield a posterior classification probability for the ship image.

If the posterior classification probability is above a predetermined value, the image is assigned is assigned a posterior classification. If the posterior probability is below the predetermined value, the image of the vessel is classified as unknown, and the gross tonnage of the vessel is calculated using the length and width of the vessel.

BRIEF DESCRIPTION OF THE DRAWINGS

The novel features of the present invention will be best understood from the accompanying drawings, taken in conjunction with the accompanying description, in which similarly-referenced characters refer to similarly referenced parts, and in which.

DETAILED DESCRIPTION OF THE EMBODIMENTS

Figure 1:
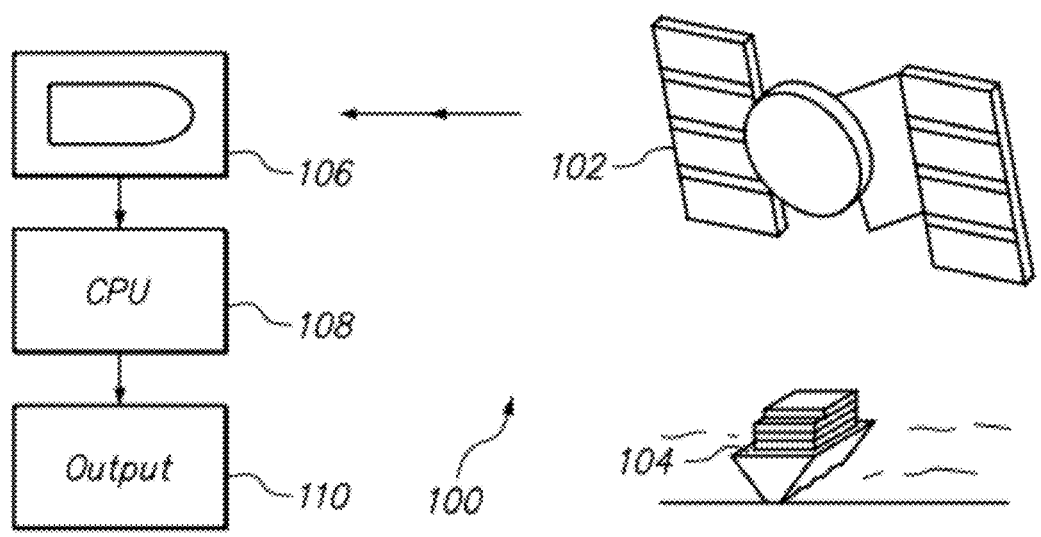
FIG. 1 is a diagram of a system for classifying vessels using overhead imagery in accordance with several embodiment of the invention.

Referring initially to FIG. 1, a system for processing of satellite imagery of vessels is shown and generally designated by reference character 100. As shown, system 100 includes a satellite 102, which detects ships/vessels 104 using imagery methods that are known in the art. One such imagery method can include nadir panchromatic electro-optical imagery. One such system and methods for detection of ship providing such satellite imagery input into the present invention can be found in U.S. patent Ser. No. 12/197,421 by Buck et al. for an invention entitled "Ship Detection System and Method from Overhead Images", which is assigned to the same assignee as the present invention. The contents of the '421 application are hereby incorporated by reference herein. The satellite 102 generates an image 106 of vessel 104. The system and methods according to several embodiments of the present invention can manipulate image 106 using a processor 108 to yield a classification output 110, which is a probability that the type of vessel that has been imaged is of a certain type, or classification. The manner in which the system classifies the satellite imagery is accomplished is described more fully below.

Figure 2:
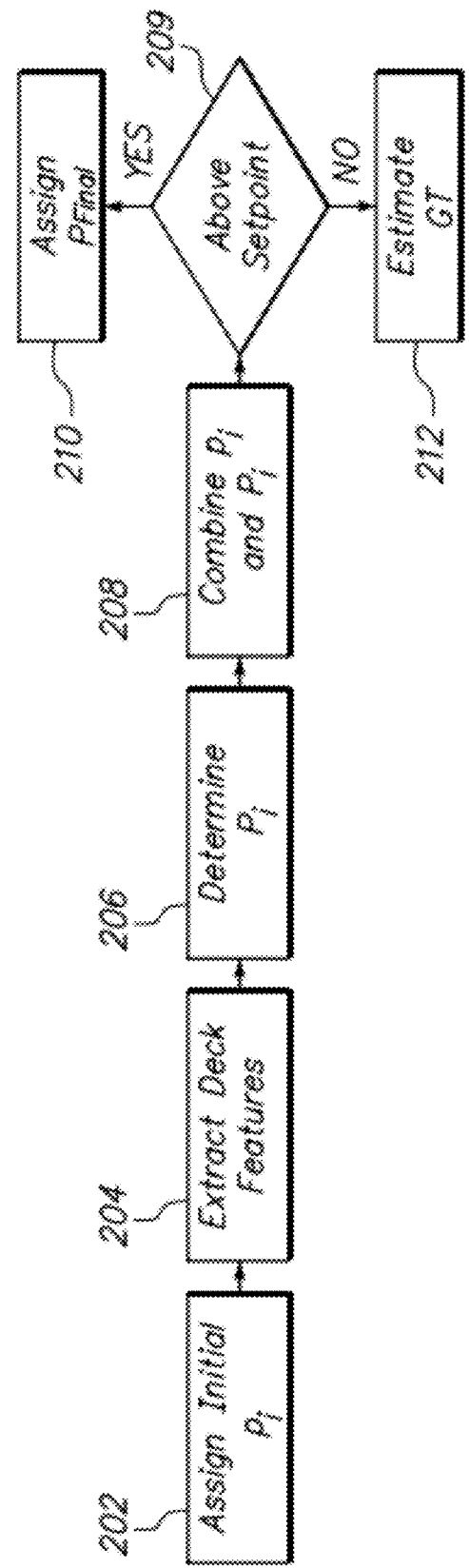
FIG. 2 is a block diagram of an algorithmic sequence in accordance with several embodiments of the present invention.

Referring now to FIG. 2, a block diagram that describes the methods according to several embodiments of the invention is shown and generally designated by reference character 200. As shown, method 200 can include the step 202 of assigning an initial classification probability $p_i$ to the detected vessel based on the vessel length and length-to-width ratio. The length, width and length-to-width ratio (ratio) of the vessel can be determined from the image 106.

Figure 3:
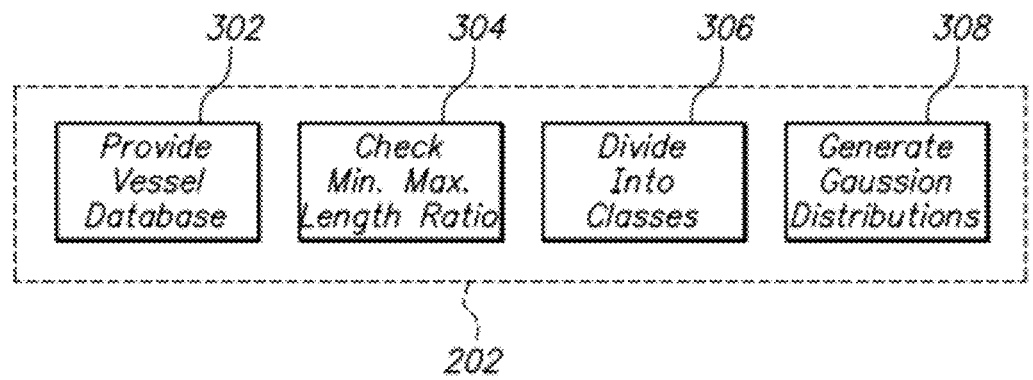
FIG. 3 is a block diagram which shows the steps taken in the assign initial classification probability step in FIG. 2 in greater detail.

As shown in FIG. 3, the initial assign step 202 can be further divided into steps, including the step 302 of providing a database of vessels that includes length and width values for the vessels. Publicly available databases of vessel registries can be used, or other registries such as the Office of Naval Intelligence MSC vessel database can be used. The length and width value are combined to form length-to-width ratio (ratio) values. The length and the ratio values are further used as described below.

As an initial check on the analysis, it should be appreciated that the largest ship length that is publicly known is almost five hundred meters (458.45 m) and the largest known ship width is 70 m. Further, in most detection software, a vessel's wake is not easily separated from the ship itself and is included in the measurement of length and width. This leads to inflated object sizes that will not compare to expected ship dimensions. In some instances, this can lead to an inaccurate classification of the vessel type and could possibly influence operational actions taken.

To avoid mis-classification of a vessel based on excessive length estimates as much as possible, and as shown in FIG. 3, as part of the initial assignment step 202 includes a step 304 to verify that the minimum and maximum length of the imaged vessel is between 5 and 500 meters inclusive, and that the minimum and maximum ratio is between 0 and 12. If the imaged vessel does not meet these criteria, the object will not be classified using the systems and methods according to several embodiments of the present invention.

Assign classification probability step 202 can also include the step of dividing the provided database into a predetermined number of classifications, in indicated by step 306 in FIG. 3. The number of classification can be chosen by the user; in some embodiments, the database can be divided into eight general vessel types: General Cargo Ship, Tanker, Passenger Ship, Bulk Carrier, Fishing Vessel, Service Ship, Research Ship, and Miscellaneous Small Vessels using Bayesian estimation to minimize the rate of misclassification. For those vessels that cannot be confidently classified into one of the general categories, linear least squares regression is used to estimate the approximate gross tonnage of the vessel. If a vessel can be estimated to be over three hundred gross tons (300 GT), the vessel is classified as Vessel Over 300 GT, as described more fully below.

As shown by step 308 in FIG. 3, a length Gaussian distribution and a ratio Gaussian distribution are generated for each division of the vessel database. This is based on the assumption that length and length to width ratio for each vessel type is normally distributed. A probability density, $p(x|t_i)$, can be plotted for each of the eight types to illustrate the expected length distribution of each division, as shown by curves 402a-h in FIG. 4, which illustrate the length distributions for the General Cargo, Tanker, Passenger Ship, Bulk Carrier, Fishing Vessel, Service Ship, Research Ship and Miscellaneous categories, respectively. In similar fashion, the ratio distribution for each division can be plotted, as shown by curves 502a-h in FIG. 5 for the General Cargo, Tanker, Passenger Ship, Bulk Carrier, Fishing Vessel, Service Ship, Research Ship and Miscellaneous categories, respectively).

Figure 4:
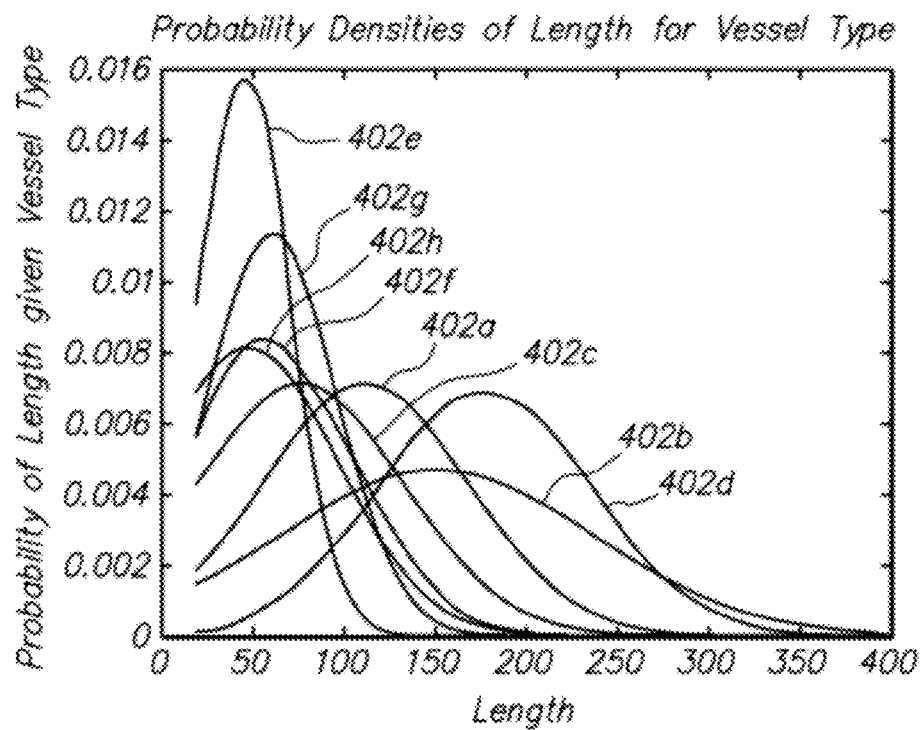
FIG. 4 is a graph depicting Gaussian distributions of vessel lengths resulting from the steps taken in FIG. 3.
Figure 5:
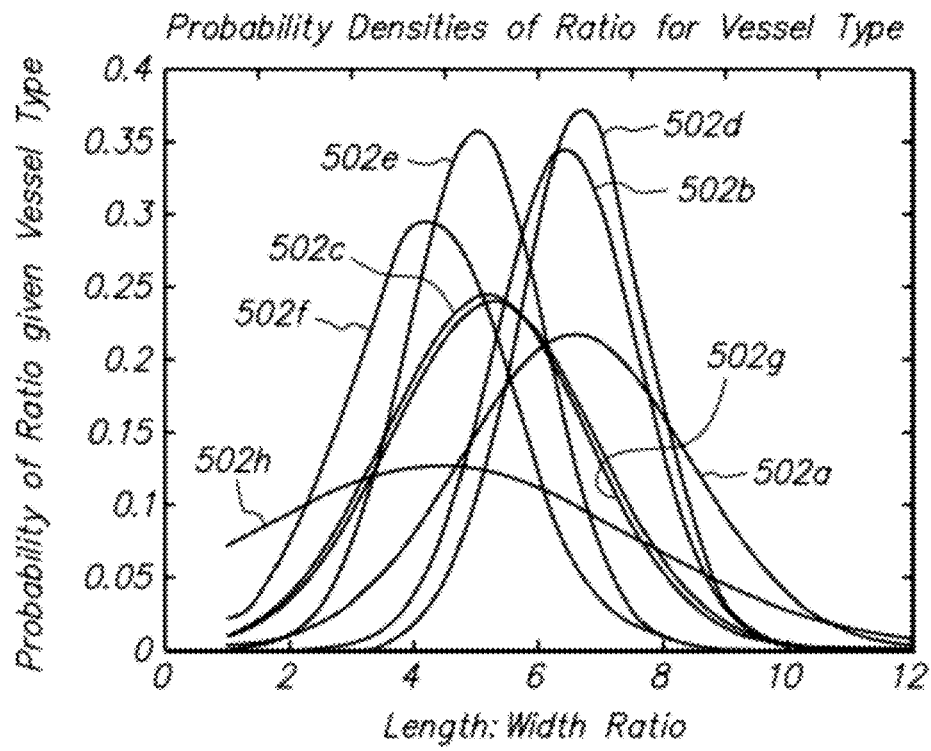
FIG. 5 is a graph depicting Gaussian distributions of vessel length-to-width ratios resulting from the steps taken in FIG. 3.

As indicated by FIGS. 4 and 5, the probability density functions (Gaussian distributions) for length and for ratio have a large amount of overlap between vessel types. To improve performance, these variables are combined. For each of the eight vessel types represented, a probability density, $p(x|t_i)$, is estimated based on the length and length-to-width ratio continuous variables. As a first step, the classifier calculates the eight joint probability estimates using a two-dimensional Gaussian distribution as described below in Equation (1):

$$p(x \mid t_i) = \frac{1}{(2\pi)|\Sigma|^{1/2}} \exp\left[-\frac{1}{2}(x-\mu)^t \Sigma^{-1}(x-\mu)\right] \quad (1)$$

Where x is the two-dimensional feature vector x=(length, ratio) and the mean and covariances are based on iterative analysis of the vessel database. The mean, $\mu$, is a 2×8 matrix of the mean of ratio and length (columns) for each vessel type (rows). The covariance matrix, $\Sigma$ (ratio, length), is a 2×2×8 matrix. Each of the eight 2×2 sub-matrices correspond to a vessel type. Within these sub-matrices, the diagonal elements are the variances of ratio and length for the vessel type and the non-diagonal elements are the covariance of ratio and length for the vessel type. The mean and covariance matrices used for the methods according to several embodiments are:

| Vessel Type | $\mu_i$ of ratio | $\mu_i$ of length |
|---|---|---|
| 1 - General Cargo | 6.60264018107829 | 112.360732610093 |
| 2 - Tanker | 6.45132335742370 | 151.470995864559 |
| 3 - Passenger Ship | 5.18571987591333 | 76.7320463333526 |
| 4 - Bulk Carrier | 6.71370684847791 | 177.127793924296 |
| 5 - Fishing Vessel | 5.01522213258810 | 45.0233505155148 |
| 6 - Service Ship | 4.21136127135022 | 57.2161801679049 |
| 7 - Research Ship | 5.30019328230826 | 61.1239296266376 |
| 8 - Miscellaneous | 4.45121682912778 | 47.9491718205200 |

| Vessel Type | $\Sigma$ (ratio, length) | |
|---|---|---|
| 1 - General Cargo | 3.347112802807 | 34.551909197315 |
|  | 34.551909197315 | 3181.572230278202 |
| 2 - Tanker | 1.329523612994 | 22.645852794162 |
|  | 22.645852794162 | 7357.468889200947 |
| 3 - Passenger Ship | 2.647238889160 | 61.535451092467 |
|  | 61.535451092467 | 3173.980731982727 |
| 4 - Bulk Carrier | 1.142094163511 | 24.029257821627 |
|  | 24.029257821627 | 3384.317955324302 |
| 5 - Fishing Vessel | 1.2422572887962 | 19.4815318208132 |
|  | 19.481531820813 | 654.5337136660958 |
| 6 - Service Ship | 1.795897706274 | 36.068455965604 |
|  | 36.068455965604 | 2296.298846350495 |
| 7 - Research Ship | 2.746362720362 | 26.607059507672 |
|  | 26.607059507672 | 1235.931617629279 |
| 8 - Miscellaneous | 10.009712711650 | 43.322512529420 |
|  | 43.322512529420 | 2421.100085891554 |

Each probability, $p(x|t_i)$, is the likelihood that a vessel with the extracted features will be in that vessel type. A vessel is classified into a type t if type t is more likely than any other type based on the estimated probabilities. That is, the vessel as assigned an initial classification type i based on its length and ratio if:

$$p(x|t_i) \geq p(x|t_j) \text{ for all } i \neq j. \tag{2}$$

Once the vessel image is assigned an initial classification probability $p_i$, and referring back to FIGS. 1 and 2, the methods according to several embodiments of the invention can include the step 204 of extracting deck features from image 106 to identify the presence or absence of spherical tanks, hatches, and cargo containers on the decks of vessels 104 that have been detected by the automated ship detection software system. There are specific ship types that are known to have these features. The deck features listed above tend to be mutually exclusive; that is, vessels that have spherical tanks on deck do not have hatches or cargo containers on deck, vessels with deck hatches do not typically also have spherical tanks or containers, and vessels with containers typically do not also have spherical tanks or hatches on deck. When one of these mutually exclusive deck features is identified, the number of possible vessel types for the detected object is limited. The presence of one of these features results in a more confident classification estimate, as described in more detail below.

Figure 6:
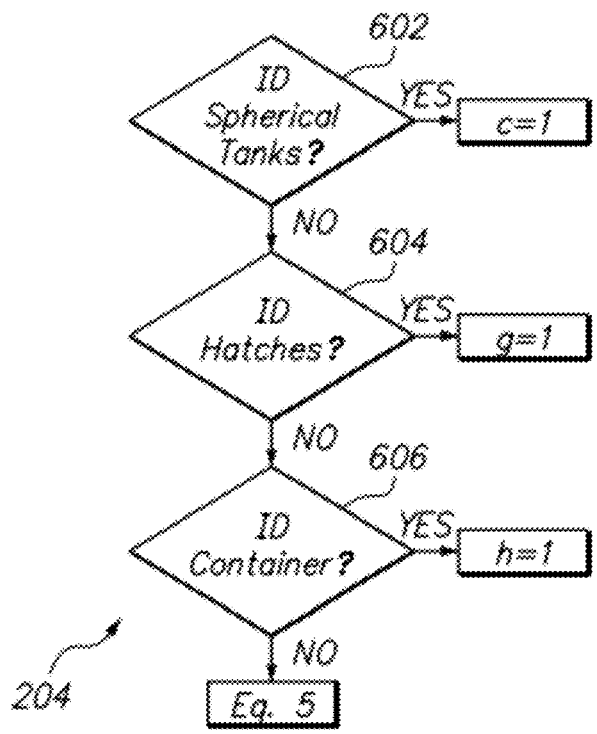
FIG. 6 is a block diagram which shows the steps taken in the extract deck features step in FIG. 2 in greater detail.

As shown in FIG. 6, the deck features extraction step 204 can include identification of spherical tanks, identification of deck hatches and identification of cargo containers on deck, as depicted by steps 602, 604 and 606, respectively. If spherical tanks are detected, the deck extraction step is completed. If the algorithm does not positively identify spherical tanks on a detected object, it looks for hatches, and so on. As described herein, spherical tanks can be extracted from image 106 first; it should be appreciated, however, that the sequence extraction of spherical tanks, hatches and cargo containers from image 106 could be varied according to the needs of the user.

As mentioned above, the systems and methods according to several embodiments of the invention identify the presence or absence of spherical tanks on deck, as shown by step 602. One way to accomplish this step is by using an image processing vision library. One such algorithm is the OpenCV library, which is publicly available and which was leveraged in several embodiments of the invention.

Figure 7:
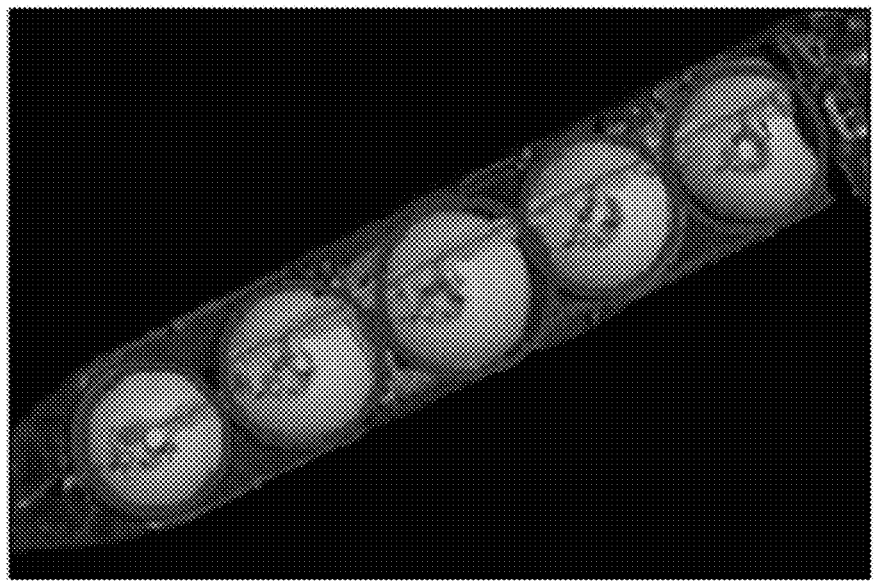
FIG. 7 is a black and white photograph of a vessel that has spherical tanks on its deck.

The vessel image 106 is first smoothed to help reduce false detection of circles. OpenCV's cvHoughCircles function can be used to identify the centers of the circles. Identified circles with radii of between 25 and 35 pixels are kept for consideration. A linear least squares line fit is found using the center of each circle. The residual error is then computed for the fit. The residual is the difference between the centers of the circles and the linear least squares line fit. If the residual error of the line fitting is less than 1, with at least 5 circles detected, the vessel is identified as having spherical tanks on deck. FIG. 7 illustrates an image of such a vessel, which has undergone the cVHoughCircle function to identify spherical tanks on deck.

Figure 8:
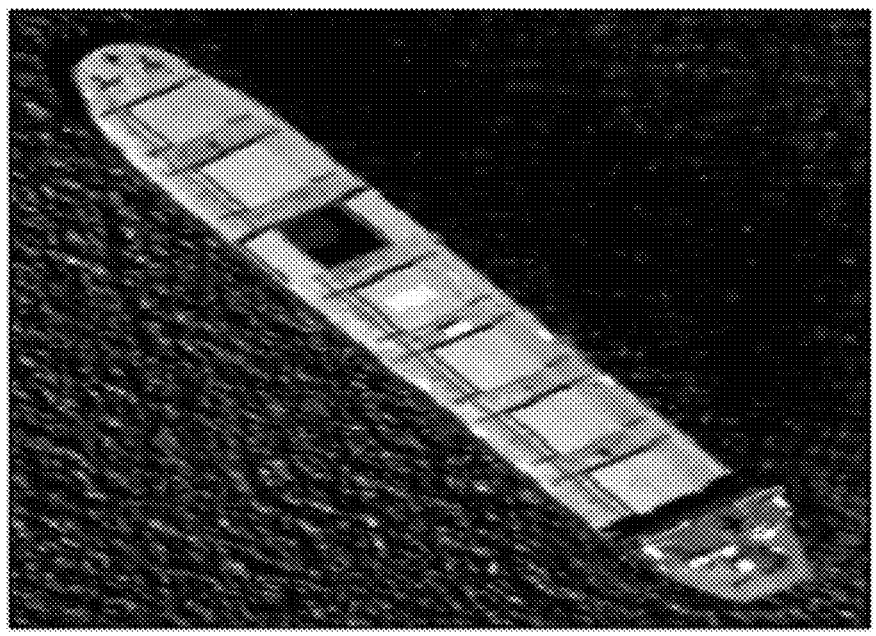
FIG. 8 is a black and white photograph of a vessel that has hatches on its deck.

As shown by step 604 in FIG. 6, if spherical tanks are not detected, the methods according to several embodiments of the present invention can also attempt to identify hatches. This step can be accomplished by using a modified version of openCV's square detector function, combined with the aforementioned least squares line fit residual described above. The least squares line fit residual can be used because, like spherical tanks, hatches on ships tend to be arranged along the longitudinal axis of the vessel, as shown in FIG. 8.

To accomplish 604, image 106 is run through OpenCV's square detector program. The square detector applies two image processing methods to transform the grayscale image of the detected object and produce a binary image output. The detector employs cvCanny once and cvThreshold ten times using the image 106 pixel mean and standard deviation as parameters to complete the transformation. The binary output from the transformation can be sent to cvFindContours, which uses the CV_RETR_CCOMP mode of the openCV algorithm to find rectangles in the image. The rectangles detected are required to be: (1) between 35 and 1000 pixels in area and (2) within 0.2 radians of $\pi/2$ in order to be counted as a positively identified rectangle.

The square detector may classify one hatch as multiple rectangles (i.e. count it multiple times). After detecting the squares, the center of the square (or group of squares) can be used to determine the linear least squares line fit. The residual error is then computed. If at least five separate rectangles are found and the residual is less than one, then vessel 104 is identified as having hatches on deck.

If image 106 does not have either spherical tanks or hatches on deck, and as shown by step 606 in FIG. 6, vessel image can also be processed to identify cargo containers on the vessel deck. To do this, a series of image processing techniques can be performed on image 106: (1) Canny Edge Detection to find the edges in the image, (2) Hough Transforms to identify lines among the edges, and (3) The resulting edge lines can be matched to known cargo container patterns.

Figure 9:
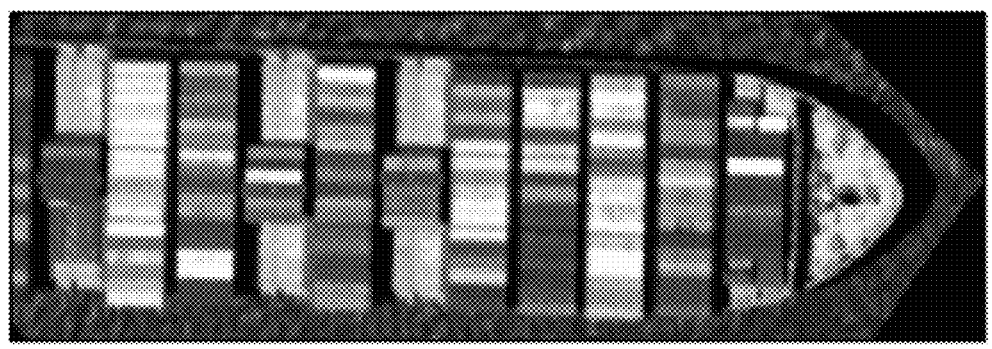
FIG. 9 is a black and white photograph of a vessel that has containers in its deck
Figure 10:
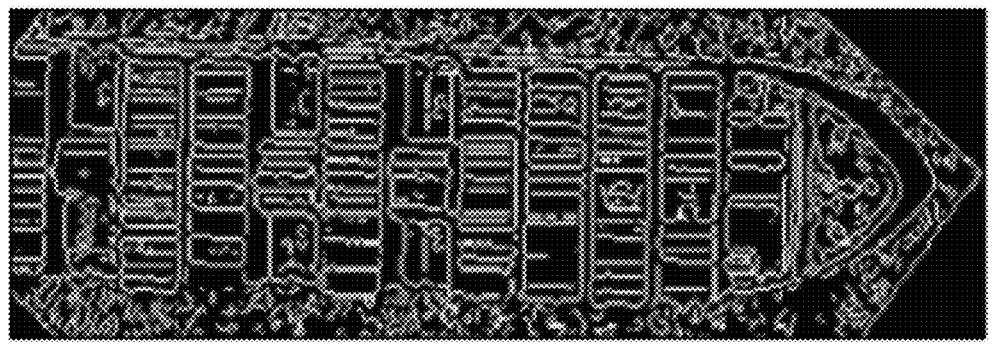
FIG. 10 is a black and white photograph which depicts a vessel image that has undergone a Canny edge detection according the methods of several embodiments of the present invention.
Figure 11:
FIG. 11 is a black-and-white photograph of the vessel of FIG. 10, which has undergone a Hough transform; and, FIG. 12 is a lined drawing which the depicts the shrinking window technique used to find ladder patterns within the photograph of FIG. 11, which are indicative of containers on the deck of the vessel.

FIG. 9 is a photograph of an image 106 that has containers on deck. As mentioned above, Canny edge detection is used to find the boundaries (edges) between adjacent areas of contrasting intensity. The result of processing image 106 in this manner is shown in FIG. 10. The Hough transform can then be used to select only those edges that are linear. The parameters of the Hough transform have been optimized to ensure that the number of pixels required to characterize a group of pixels as a "line" are the most likely to produce accurate results. The results of a Hough transform of the Canny edge-processed image are illustrated in FIG. 11.

Figure 12:
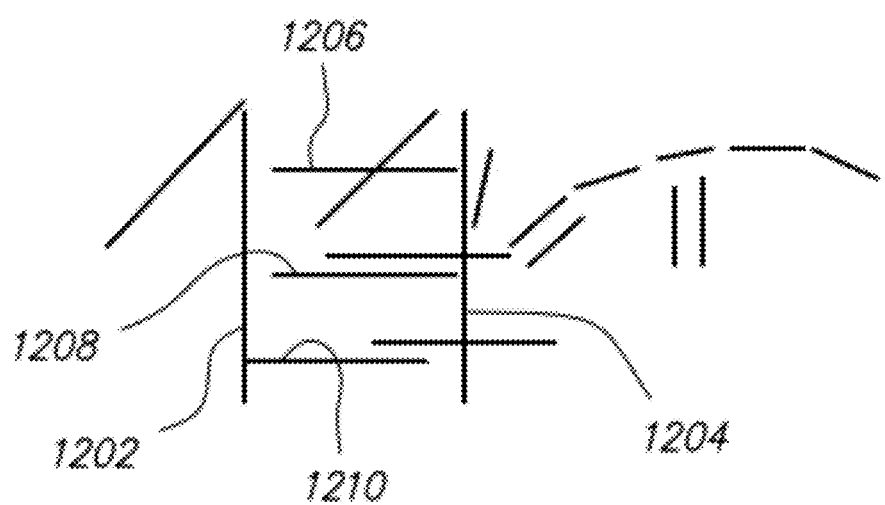

After identifying the linear edges in the image, the algorithm searches for the characteristic shapes of cargo containers. Cargo containers are typically arranged side-by-side and oriented lengthwise along the length of the vessel. The methods according to several embodiments can seek to identify the distinctive "ladder" patterns that are formed by the edges of the containers in the Hough transformed image shown FIG. 11. The ladder pattern can be indicative of the presence of containers on the deck of the vessel 102; the ladder pattern is depicted in FIG. 12. A "shrinking window" method as described below can be used to look for ladder patterns.

The "shrinking window" method begins by setting the image in the first quadrant of an x-y plane. Beginning with the left-most vertical line (V1), indicated by line 1202 in FIG. 12, it locates the vertical line with the next-greater x-value. This new vertical line is called V2, which is depicted by reference character 1204 in FIG. 12. If V2 (line 1204) has at least a given range of y-coordinate pixel locations in common with V1 (line 1202), then V1 and V2 overlap in a vertical sense. If this overlap exists, then the algorithm locates all horizontal line segments that fall between V1 and V2 (lines 1206, 1208 and 1210). If more than one such horizontal line exists, we say that a "ladder" has been found, with the vertical lines representing "rails" and the horizontal lines representing "rungs", as shown in FIG. 12.

Lines 1202 and 1204 and each pair of these horizontal line segments (lines 1206, 1208 and 1210) form the boundaries of rectangular boxes. The pixel-distance, $D_h$, between each consecutive pair of horizontal lines is compared to the pixel distance, $D_v$, between V1 and V2. The ratio $D_v/D_h$ is compared to the length/width ratios for known container types.

This process is iterated towards the right side of the image, and V1 (1202) is tested against vertical lines with successively greater x values. Having tested for "rungs" between V1 and V2 (lines 1202 and 1204), the algorithm removes from further consideration the range of y-values from V1 (line 1202) that were overlapped by V2 (1204). This prevents the inclusion as "rungs" of other horizontal lines that cross V2 (1204). In this way, the algorithm shrinks, and possibly divides, the vertical range of V1 (1202) against which to test the next vertical line, and the "window" of available y-values "shrinks" with successive iterations.

After comparing line 1202 (V1) to all other vertical lines to the right, the algorithm repeats the process using line 1204 (V2). Vertical line segments that share the same x-value can be common, and they are run through the algorithm in the order that they are output by the Hough transform.

If the total number of correctly-proportioned "rung-ladder" boxes is at least 2, the object in the image is run through OpenCV's square detector program. The process that follows is the same as the process used for identification of hatches that is described above. Like before, the square detector takes in the grayscale image of the ship and employs cvThreshold and cvCanny, using the image's pixel mean and standard deviation as parameters, to transform the image. The binary output from the transformation is sent to cvFindContours, a function of OpenCV which uses the CV_RETR_CCOMP mode, to find rectangles in the image. The rectangles found are required to be between 35 and 1000 pixels in area, and the angles between the sides of each square must be within 0.2 radians of π/2. If more than five rectangles that meet these parameters are found, the vessel is identified as having cargo containers on deck.

Once deck features have been extracted form the vessel image 106 as described above, the methods according to several embodiments can include the step 206 determining a weighting factor $P_i$ that is based on the presence (or absence) of the aforementioned predetermined deck feature in the overhead image 106 of vessel 102. Weighting factor $P_i$ make the classification output 110 more accurate by weighting the initial classification probability $p_i$ to reflecting the relative frequency that vessels of various types occur. Stated differently, if the eight vessel types occur with frequencies $P_1$, $P_2$, ..., $P_8$, the minimum error rate classifier is obtained by weighting $p_i$ with the $P_i$'s. As a result, a vessel with feature data x is classified as being from type i if $$p(x|t_i)P_i \geq p(x|t_j)P_j \text{ for all } i \neq j. \quad (3)$$

In several embodiments, the weighting factor $P_i$ can reflect a combination of factors: 1) Number of vessels of that type in the database used for analysis (weighted prior); 2) Uniform prior—giving equal weight to all vessel types; 3) Discrete probability of vessel type within a range of vessel lengths; 4) Discrete probability of containers in each of the vessel types; 5) Discrete probability of hatches in each of the vessel types; and, 6) Discrete probability of spherical tanks in each of the vessel types.

After searching for all three mutually exclusive deck features, If spherical tanks are identified, c=1, if hatches are identified from step 204, h=1, and if cargo containers are identified, g=1. If one of the three mutually exclusive deck features is confidently identified, the $P_i$ is:

$$P_i(x) = prior_i = \begin{cases} p(t_i | c) & \text{if } c = 1 \\ p(t_i | h) & \text{if } h = 1 \\ p(t_i | g) & \text{if } g = 1 \end{cases} \quad (4)$$

Based on results from analysis of vessel data from the vessel database, these prior probabilities $P_i$ can be specified as:

| Vessel Type | $p(t_i | c = 1)$ | $p(t_i | h = 1)$ | $p(t_i | g = 1)$ |
| --- | --- | --- | --- |
| 1 - General Cargo | 0.60028487370 | 0.26584268428 | 0.00701707850 |
| 2 - Tanker | 0.06528500624 | 0.02905222759 | 0.96799411344 |
| 3 - Passenger Ship | 0.05455713632 | 0.01202620217 | 0 |
| 4 - Bulk Carrier | 0.14038851113 | 0.60035069475 | 0.02498880804 |
| 5 - Fishing Vessel | 0.00641991790 | 0.05202113291 | 0 |
| 6 - Service Ship | 0.05030064856 | 0.01028565967 | 0 |
| 7 - Research Ship | 0.03322549423 | 0.01933238019 | 0 |
| 8 - Miscellaneous | 0.04953841189 | 0.01108901840 | 0 |

If none of the three mutually exclusive deck features is confidently identified in vessel image 106, the prior weighting factor $P(t_i)$ can be determined by Equation (5):

$$P(t_i) = prior_i = 0.5 priorIQR_i + 0.3 priorWeighted_i + 0.2 priorUniform_i \quad (5)$$

In Equation (5), the priorUniform variable is a uniform probability that assumes an equal amount of vessels in the database for each classification type, and the priorWeighted variable describes the relative frequency each category from the vessel database appears. The priorIQR variable is the discrete probability of vessel type within a range of vessel lengths. Based on results from analysis of the vessel database, these probability calculations are based on comparison to interquartile data range statistics for the tanker category of vessels. The distribution of the tanker category vessel lengths was determined to be a good source for comparison to normalize the prior probabilities assigned (although any of the other vessel categories could be chosen for normalization, if desired). In any case, the length of the vessel image 106 is compared to the tanker category lower quartile length, tanker category median length, and tanker category upper quartile length to determine the priorIQR value. The length of vessel image 106 will be in one of four ranges: (1) vessel image length is less than or equal to tanker Lower Quartile Length; (2) vessel image length is greater than tanker Lower Quartile Length and vessel image length is less than or equal to tanker Median Length; (3) vessel image length is greater than tanker Median Length and vessel image length is less than or equal to tanker Upper Quartile Length; or, (4) vessel image length is greater than tanker Upper Quartile Length. The priorIQR is assigned based on which of the four ranges the vessel image length is in.

The priorIQR, priorWeighted, and priorUniform values are determined as follows:

$$priorIQR_i = \begin{cases} p(t_i \mid l \leq \text{Type 2 Lower Quartile Length Bound}) \\ p(t_i \mid l > \text{Type 2 Lower Quartile Length Bound \&} \\ \quad l \leq \text{Type 2 Median Length}) \\ p(t_i \mid l > \text{Type 2 Median Length \&} \\ \quad l \leq \text{Type 2 Upper Quartile Length Bound}) \\ p(t_i \mid l > \text{Type 2 Upper Quartile Length Bound}) \end{cases} \quad (6)$$

Based on results from analysis of data from the vessel database, these prior probabilities are:

| Vessel Type | $p(t_i \mid l \leq \text{Type 2 Lower})$ | $p(t_i \mid l > \text{Type 2 Lower \&} \\ l \leq \text{Type 2 Med})$ |
|---|---|---|
| 1 - General Cargo | 0.067341868956 | 0.18774919516 |
| 2 - Tanker | 0.048586182184 | 0.11146444700 |
| 3 - Passenger Ship | 0.12663688908 | 0.16536638158 |
| 4 - Bulk Carrier | 0.010851195352 | 0.093610776921 |
| 5 - Fishing Vessel | 0.22578314851 | 0.048899236286 |
| 6 - Service Ship | 0.16722421893 | 0.13581759701 |
| 7 - Research Ship | 0.17107621008 | 0.14406855619 |
| 8 - Miscellaneous | 0.18250028689 | 0.11302380982 |

| Vessel Type | $p(t_i \mid l > \text{Type 2 Med \&} \\ l \leq \text{Type 2 Up})$ | $p(t_i \mid l > \text{Type 2 Up})$ |
|---|---|---|
| 1 - General Cargo | 0.21672524510 | 0.063107813606 |
| 2 - Tanker | 0.24743438920 | 0.43653093712 |
| 3 - Passenger Ship | 0.1004431423 | 0.013463422766 |
| 4 - Bulk Carrier | 0.36366504587 | 0.48543702264 |
| 5 - Fishing Vessel | 0.00013189462875 | 2.4748370277e-11 |
| 6 - Service Ship | 0.034526043783 | 0.00083904570293 |
| 7 - Research Ship | 0.011347848937 | 1.0331765348e-05 |
| 8 - Miscellaneous | 0.025726390120 | 0.000611426356091 |

$$priorWeighted_i = \frac{\text{total vessels of type } i}{\text{total vessels in database}} \quad (7)$$

| Vessel Type | $priorWeighted_i$ |
|---|---|
| 1 - General Cargo | 0.313064787678493 |
| 2 - Tanker | 0.154129201222174 |
| 3 - Passenger Ship | 0.0531682983101578 |
| 4 - Bulk Carrier | 0.0897661657417223 |
| 5 - Fishing Vessel | 0.191379933902850 |
| 6 - Service Ship | 0.141876909646443 |
| 7 - Research Ship | 0.0119841616262393 |
| 8 - Miscellaneous | 0.0446305418719212 |

$$priorUniform_i = \frac{1}{8} = .125 \text{ for all } i. \quad (8)$$

Once the weighting factor $P(t_i)$ is determined by Equation (4) or Equation (5) according to step 206, and referring back to FIG. 2, the initial probability $p_i$ and weighting factor $P(t_i)$ are combined, as shown by step 208 in FIG. 2. The prior probability and likelihood calculation are combined according to Bayesian Estimation to calculate a normalized final posterior likelihood for each of the eight vessel types. Based on the observed feature information, a final posterior likelihood is obtained using Equation (9), as follows:

$$p_{Final}(t_i \mid x) = \frac{p(x \mid t_i)P_i(x)}{\sum_{i=1}^{8} p(x \mid t_i)P_i(x)} \quad (9)$$

If one of the three mutually exclusive deck features (tanks, hatches, and containers) is identified on the vessel, this information is reflected in the ship type. For those vessels with tanks, the vessel type will include "Liquefied Gas Carrier" (ex: Tanker: Liquefied Gas Carrier) as this is the cargo that is carried in the spherical tanks. For those with containers, the vessel type will include "Container Ship" (ex: General Cargo: Container Ship) to indicate that containers were detected on deck. Similarly, those with hatches confidently identified, the vessel type will include "Hatches" (ex: Bulk Carrier: Hatches).

To further reduce the misclassification rate, and as shown by decision step 209 in FIG. 2, a detected vessel is only classified into one of the eight main types if the normalized final posterior likelihood P Final exceeds a predetermined value. For several embodiments of the invention, the predetermined value can be 0.70, although other values could be used by the operator, taking into account the operation environment, including the number of vessel images to be processed and the criticality of the correctness of classification.

For those ships that cannot be confidently classified into one of the eight specific ship types, General Cargo Ship, Tanker, Passenger Ship, Bulk Carrier, Fishing Vessel, Service Ship, Research Ship, and Miscellaneous Small Vessel, an additional step 212 as shown in FIG. 2 can be taken to estimate the gross tonnage (GT) based on length and width, in order to provide some information to the operator in lieu of a vessel classification. An approximate estimate of GT is valuable information for use with other intelligence information, such as vessel movement tracking via the automatic identification system (AIS) broadcasts. AIS is required on all vessels over 300 GT, passenger ships certified to carry more than 150 passengers, towing vessels of 26 feet or more in length, and self-propelled vessels of 65 feet or more. It is important for vessel tracking and surveillance to identify vessels that should be transmitting AIS.

A rough estimate of gross tonnage, which is related to the overall internal volume of a vessel, can be computed based on the length and width of a vessel detected in satellite imagery. The gross tonnage is a function of volume and a constant multiplier K:

$$GT = K \times V \quad (10)$$

Where GT=Gross Tonnage, K is a reduction factor (between 0.22 and 0.32) which varies depending on the vessel volume, and V is the total vessel volume. The total vessel volume is determined by multiplying the internal dimensions, the length, width, and height (depth), of all internal spaces. This value, V, can be approximated as a function of the observed vessel length, width and a constant C, where C represents the combined height of all internal spaces. Therefore, the gross tonnage can be re-written as a function of Length, Width, and constants K and C:

$$GT = K \times V \rightarrow GT = K \times C \times \text{Length} \times \text{Width} \quad (11)$$

The two constants K and C can be combined to form:

$$GT = M \times \text{Length} \times \text{Width}$$

$$M = K \times C \quad (12)$$

Length and Width are the length and width of the vessel in image 106. If the gross tonnage is estimated to be over 300 GT with at least ninety percent (90%) confidence, the vessel 104 can be classified "UNKNOWN—Over 300 GT".

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for processing an overhead image of a vessel, said vessel having a length, a width and length-to-width ratio, said method comprising the steps of:
   A) assigning a initial classification and an initial classification probability to said vessel based on said length and said ratio;
   B) extracting mutually exclusive deck features from said image;
   C) weighting said initial classification probability using the result of said step B); and,
   D) combining the results of said step A) and said step C) using a predetermined formula to yield a posterior classification probability for said ship.

2. The method of claim 1, wherein said mutually exclusive deck features are selected from the group consisting of hatches, containers and spherical tanks.

3. The method of claim 1 wherein said initial classification is selected from the group consisting of general cargo, tanker, passenger ship, bulk carrier, fishing vessel, service ship, research ship and miscellaneous.

4. The method of claim 1, further comprising the step of:
   E) assigning a posterior classification if said posterior classification probability is above a predetermined value.

5. The method of claim 4, wherein said predetermined value if 0.7.

6. The method of claim 4 wherein said posterior classification probability is below said predetermined value, and further comprising the step of:
   F) estimating the gross tonnage for said vessel.

7. The method of claim 1, wherein said step A) further comprises the steps of:
   A1) providing a vessel database;
   A2) checking said length and said ratio are within predetermined minimum and maximum length and ratio values;
   A3) dividing said database into classifications; and,
   A4) generating Gaussian distributions for each said classification.

8. A system for processing overhead imagery, comprising a satellite for generating overhead images, a processor and a computer readable storage medium storing instructions that, when executed by said processor, cause said processor to perform a method for processing said overhead images from said satellite to automatically detection of ships, said ships having a length, a width, and a length-to-width ratio, said method comprising the steps of:
   A) assigning a initial classification and an initial classification probability to said vessel based on said length and said ratio;
   B) extracting mutually exclusive deck features from said image;
   C) weighting said initial classification probability using the result of said step C); and,
   D) combining the results of said step A) and said step C) using a predetermined formula to yield a posterior classification probability for said ship.

9. The system of claim 8, wherein said mutually exclusive deck features are selected from the group consisting of hatches, containers and spherical tanks.

10. The system of claim 8 wherein said initial classification is selected from the group consisting of general cargo, tanker, passenger ship, bulk carrier, fishing vessel, service ship, research ship and miscellaneous.

11. The system of claim 8, wherein said method accomplished by said processor further comprises the step of:
   E) assigning a posterior classification if said posterior classification probability is above a predetermined value.

12. The system of claim 11, wherein said predetermined value if 0.7.

13. The system of claim 11 wherein said posterior classification probability is below said predetermined value, and further comprising the step of:
   F) estimating the gross tonnage for said vessel.

14. The system of claim 8, wherein said step A) of said method accomplished by said processor further comprises the steps of:
   A1) providing a vessel database;
   A2) checking said length and said ratio are within predetermined minimum and maximum length and ratio values;
   A3) dividing said database into classifications; and,
   A4) generating Gaussian distributions for each said classification.

* * * * *